United States Patent Office 3,190,799
Patented June 22, 1965

3,190,799
PROCESS FOR PREPARING INHALATION THERAPY
Sheldon Cohen, Reseda, and Gerald A. Laursen, Van Nuys, Calif., assignors, by mesne assignments, to Rexall Drug and Chemical Company, Los Angeles, Calif., a corporation of Delaware
No Drawing. Filed Mar. 21, 1963, Ser. No. 266,793
2 Claims. (Cl. 167—54)

The present invention relates to pressurized compositions of an acid addition salt of 1-(3,5-dihydroxyphenyl)-1-hydroxy-2-isopropylaminoethane having a high degree of stability adapted for administration in aerosol form in inhalation therapy as well as to a process of preparing such compositions and the active ingredients therein.

The compound 1-(3,5-dihydroxyphenyl)-1-hydroxy-2-isopropylaminoethane in the form of its acid addition salts has good therapeutic properties as a bronchodilator and extensive clinical investigation has been carried out on this material in tablet form for oral administration. Inasmuch as other well-known bronchodilators, for example isoproterenol and epinephrine, are particularly adapted to inhalation therapy through their formulation into pressurized self-propelling compositions of the class described in U.S. Patent 3,014,844, efforts have been directed towards preparation of such self-propelling compositions of acid addition salts of the compound 1-(3,5-dihydroxyphenyl)-1-hydroxy-2-isopropylaminoethane.

Attempts to suspend such salts in their presently available forms in a pressurized propellent system in the presence of suspending agents of the type described in the aforementioned U.S. Patent 3,014,844, have not proved particularly successful due to tendencies of such compositions to form caky deposits on the walls and to form clumps and agglomerates of the suspended material. It is apparent that with any material intended to inhalation therapy where close control of dosage is essential, any tendency of the composition to form such cakes or clumps will result in nonreproducibility of dosage with a possibility of harm to the patient.

The compound 1-(3,5-dihydroxyphenyl)-1-hydroxy-2-isopropylaminoethane in the form of its acid addition salts has proved to be difficult to purify by crystallization, with only a limited class of solvents, particularly the lower alkanols having 1 to 3 carbon atoms, being satisfactory. Analysis of the crystalline product indicates that it contains significant amounts of the lower alkanol solvent used in the crystallization step which is bound to the molecule in the form of alkanol of crystallization. It has been suspected that the presence of this alkanol of crystallization in some means contributes to the unsatisfactory suspension properties of this material in pressurized propellants. Attempts, however, to subject crystalline material to a drying atmosphere for extended periods of time have proved unsuccessful in improving the qualities of the pressurized suspension obtained therefrom.

It is an object of this invention to provide a pressurized composition of an acid addition salt of 1-(3,5-dihydroxyphenyl)-1-hydroxy-2-isopropylaminoethane which possesses a high degree of stability against tendencies of the material to cake on the walls of the container and form clumps or agglomerates.

Another object of the invention is to provide a method of treating a crystalline acid addition salt of 1-(3,5-dihydroxyphenyl)-1-hydroxy-2-isopropylaminoethane to render the material satisfactory for the preparation of a stable pressurized suspension in a propellent system.

Other objects and the advantages of the invention will become apparent from the following detailed description.

The invention sought to be patented in its composition aspect resides in a pressurized composition containing a suspension of an acid addition salt of 1-(3,5-dihydroxyphenyl)-1-hydroxy-2-isopropylaminoethane in a liquefied propellant wherein said salt contains less than 0.1% by weight of a lower alkanol of crystallization.

The invention sought to be patented in a first process aspect resides in the concept of a process of treating an acid addition salt of 1-(3,5-dihydroxyphenyl)-1-hydroxy-2-isopropylaminoethane which has been crystallized from a lower alkanol and as a result contains lower alkanol of crystallization in a sequence of steps comprising reducing the particle size of such crystalline material such that 95% by weight is in the form of particles having a diameter of less than 10 microns and subjecting the resulting finely divided material to heat for a time sufficient to reduce the concentration of the lower alkanol of crystallization therein to less than 0.1% by weight.

The invention sought to be patented in a second process aspect resides in the concept of a process of reducing the particle size of an acid addition salt of 1-(3,5-dihydroxyphenyl)-1-hydroxy - 2 - isopropylaminoethane containing lower alkanol of crystallization such that 95% by weight of the resulting material is in the form of particles having a diameter of less than 10 microns, subjecting such finely divided material to a heat-treatment step for a time sufficient to reduce the concentration of lower alkanol of crystallization to less than 0.1% of the weight of the material and thereafter suspending the resulting dried and finely divided material in a liquid system comprising a pressurized propellant to form a pressurized uniform suspension thereof.

The compound 1-(3,5-dihydroxyphenyl)-1-hydroxy-2-isopropylaminoethane is well known, its therapeutic properties being described in Arzneimittel-Forschung, 521–531 (June 1961) and may be prepared in accordance with conventional techniques described in German Patent 865,315 and U.S. Patent 2,308,232 by the following general reaction sequence:

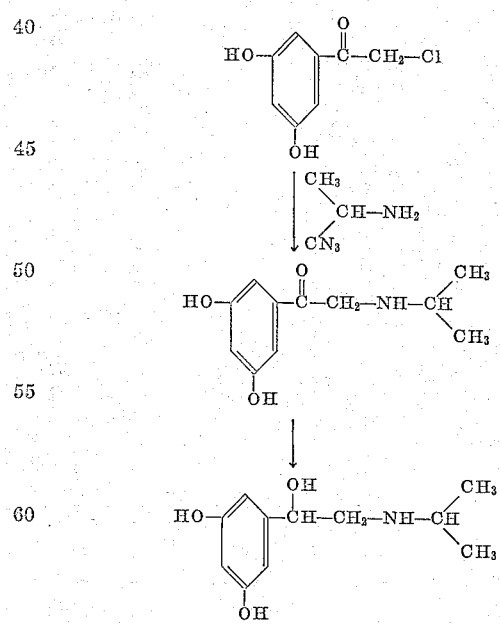

For therapeutic use, the compound is normally administered in the form of a pharmaceutically acceptable nontoxic acid addition salt, for example, the hydrochloride, the sulfate, and the like, with the sulfate salt being particularly effective.

In accordance with the above illustrated process, the product in the form of an acid addition salt is crystallized from a lower alkanol containing 1 to 3 carbon atoms such as methanol, ethanol, propanol, and the like, with methanol and ethanol being particularly preferred crystallization solvents. The crystallized salts generally contain about 3 to about 7 percent by weight of lower alkanol of crystallization.

U.S. Patent 3,014,844 describes self-propelling powder-dispensing compositions comprising a finely divided powder, which may be a therapeutically active material, suspended in a mixture of a liquefied propellant and a surface-active agent. Attempts to utilize acid addition salts of 1-(3,5-dihydroxyphenyl)-1-hydroxy-2-isopropylaminoethane prepared as described above in the preparation of compositions of the type described in U.S. Patent 3,014,844, have not been successful due to the presence of lower alkanol of crystallization which is introduced into the molecule during the process of preparing the active ingredient.

It has now been found, in accordance with the method of the present invention, that the treatment of such acid addition salts containing the aforementioned lower alkanol of crystallization by a process which serves to reduce the alkanol of crystallization contained therein to less than 0.1% by weight results in a material which when suspended in a propellent system in the presence of a surface-active agent as described in U.S. Patent 3,014,844 yields highly stable and effective suspension.

It has further been found that the desired reduction of lower alkanol of crystallization content can be effectuated by a sequence of steps comprising particle size reduction followed by heat treatment.

The acid addition salt containing lower alkanol of crystallization as described above is initially subjected to a process of particle size reduction such that at least 95% by weight of the resulting particles have a diameter of less than 10 microns. After such particle size reduction, the finely divided material is subjected to heat at a temperature and for a time sufficient to reduce the lower alkanol content therein to less than 0.1% by weight. Normally, this heat-treatment step is carried out at a temperature between about 40° C. and 100° C. under reduced atmospheric pressure. The length of the heat treatment step is a function of the temperature. The periodic removal of a sample for analysis readily permits one to determine when the desired reduction in alkanol of crystallization content has occurred. It has been found that the order of steps is of critical importance, since heat treatment without prior particle size reduction is ineffective in reducing the alkanol of crystallization content to a degree sufficient to insure preparation of a satisfactory pressurized suspension.

Following the heat-treatment step, the finely divided material is then ready for formulation into a pressurized composition by the technique described in U.S. Patent 3,014,844. Generally, the composition comprises a liquefied propellant, preferably a fluorinated or chlorofluorinated hydrocarbon or mixture thereof, having a vapor pressure of at least 13 pounds per square inch gauge at 70° F. The composition should also contain a surface-active agent which should desirably be nonionic, soluble in the propellant and have a hydrophile-lipophile balance (HLB) of less than 10. Generally, the composition will contain about 0.1 to about 3% by weight of the active ingredient and about 0.1 to 20% by weight of the surface-active agent. The formulation of the active ingredient with the surface-active agent and propellant may be effected by any of the techniques commonly used in the art of preparing self-propelling compositions, for example, any of the various techniques described in U.S. Patent 3,014,844.

The best mode contemplated by the inventors for carrying out their invention will now be set forth as follows:

*Example*

A quantity of 2,200 grams of 1-(3,5-dihydroxyphenyl)-1-hydroxy-2-isopropylaminoethane containing 4.6% by weight of methanol of crystallization is subjected to particle size reduction in conventional micronization equipment to yield 2,140 grams of particles, 95% by weight being less than 10 microns in diameter. The finely divided material is placed in an oven at a temperature of 56° C. and a vacuum of 29 inches of mercury for 16 hours. Analysis reveals approximately 1% by weight of methanol of crystallization. Heat treatment is continued for 60 additional hours to yield 2041 grams of material having less than 0.1% methanol of crystallization.

A pressurized composition is prepared having the following composition:

| | Weight (grams) |
|---|---|
| Heat treated material prepared as described above | 2001 |
| Sorbitan trioleate (Span 85) | 1870 |
| Freon 11 | 45782 |
| Freon 12 | 91565 |
| Freon 114 | 45782 |
| | 187000 |

A uniform suspension results with no tendencies towards the formation of clumps and agglomerates.

In contrast, a suspension prepared utilizing micronized but non-heat treated material is characterized by the presence of clumps and agglomerates and the existence of caky deposits upon the walls of the container.

The subject matter which the applicants regard as their invention is particularly pointed out and distinctly claimed as follows.

We claim:

1. A method of treating a pharmaceutically acceptable acid addition salt of 1-(3,5-dihydroxyphenyl)-1-hydroxy-2-isopropylaminoethane containing a 1 to 3 carbon atom lower alkanol of crystallization to yield a material adapted to preparation of a stable pressurized suspension thereof which comprises reducing the particle size of said salt such that 95% by weight of the particles have a diameter of less than 10 microns and heating the resulting finely divided material to a temperature between about 40° C. and about 100° C. for a time sufficient to reduce the quantity of said lower alkanol of crystallization to less than 0.1% by weight.

2. A method of preparing a pressurized composition for inhalation therapy which comprises reducing the particle size of a pharmaceutically acceptable acid addition salt of 1-(3,5-dihydroxyphenyl)-1-hydroxy-2-isopropylaminoethane containing a 1 to 3 carbon atom lower alkanol of crystallization such that 95% by weight of the particles have a diameter of less than 10 microns, heating the resulting finely divided material to a temperature between about 40° C. and 100° C. for a time sufficient to reduce the concentration of said lower alkanol of crystallization therein to less than 0.1% by weight, and suspending the heat treated material in a liquid medium comprising a propellant having a vapor pressure of at least 13 pounds per square inch gauge at 70° F.

References Cited by the Examiner

Boehringer, Chem. Abst., vol. 57, 1962, pp. 13678–13679.

JULIAN S. LEVITT, *Primary Examiner.*

FRANK CACCIAPAGLIA, JR., *Examiner.*